United States Patent
Holverson

(10) Patent No.: US 11,537,102 B2
(45) Date of Patent: Dec. 27, 2022

(54) SYSTEMS AND METHODS TO PROVIDE VENDOR MANAGED INVENTORY WITH ACTIVE TRACKING

(71) Applicant: Illinois Tool Works Inc., Glenview, IL (US)

(72) Inventor: Todd Holverson, Appleton, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 17/512,157

(22) Filed: Oct. 27, 2021

(65) Prior Publication Data

US 2022/0066414 A1 Mar. 3, 2022

Related U.S. Application Data

(63) Continuation of application No. 16/369,798, filed on Mar. 29, 2019, now Pat. No. 11,188,052.

(51) Int. Cl.
*G05B 19/4065* (2006.01)
*H04W 4/80* (2018.01)
*G05B 19/18* (2006.01)

(52) U.S. Cl.
CPC ....... *G05B 19/4065* (2013.01); *G05B 19/182* (2013.01); *H04W 4/80* (2018.02); *G05B 2219/45135* (2013.01); *G05B 2219/50185* (2013.01)

(58) Field of Classification Search
CPC ............. G05B 19/4065; G05B 19/182; G05B 2219/45135; G05B 2219/50185; H04W 4/80
See application file for complete search history.

(56) References Cited

U.S. PATENT DOCUMENTS

| | | |
|---|---|---|
| 6,510,984 B2 | 1/2003 | Blankenship et al. |
| 6,536,660 B2 | 3/2003 | Blankenship et al. |
| 6,708,877 B2 | 3/2004 | Blankenship et al. |
| 7,032,814 B2 | 4/2006 | Blankenship |
| 7,996,276 B2 | 8/2011 | Blankenship et al. |
| 9,117,154 B2 | 8/2015 | Enyedy |
| 2008/0035727 A1 | 2/2008 | Stanzel et al. |
| 2015/0158109 A1 | 6/2015 | Chantry |
| 2016/0221108 A1 | 8/2016 | Hoffa et al. |
| 2016/0318116 A1 | 11/2016 | Daniel |
| 2018/0232545 A1 | 8/2018 | Hoffa |

OTHER PUBLICATIONS

European Patent Office, Communication with extended European search report in Application No. 20154949.0 dated Sep. 9, 2020 (6 pages).
Canadian Patent Office, Examiner Requisition in application No. 3,070,304 dated Apr. 16, 2021 (5 pages).

*Primary Examiner* — Michael W Choi

(74) *Attorney, Agent, or Firm* — McAndrews, Held & Malloy, Ltd.

(57) ABSTRACT

Disclosed is a system and method to track the consumption and use period of various consumable and/or durable welding-type products via tracking the consumption and/or use of various other consumable and/or durable welding-type products. The system and method may provide alerts when the use period of a consumable and/or durable welding-type product satisfies a threshold and therefore should be replaced.

19 Claims, 6 Drawing Sheets

SYSTEMS AND METHODS TO PROVIDE VENDOR MANAGED INVENTORY WITH ACTIVE TRACKING

CROSS REFERENCE TO RELATED APPLICATIONS

This application claims priority to, and the benefit of, U.S. Non-Provisional patent application Ser. No. 16/369,798, filed Mar. 29, 2019, and titled "SYSTEMS AND METHODS TO PROVIDE VENDOR MANAGED INVENTORY WITH ACTIVE TRACKING," the contents of which are hereby incorporated by reference in their entirety.

BACKGROUND

Some products used with welding-type systems during welding-type operations are consumable, in that the products are consumed or otherwise used as part of the welding-type operations. Some durable welding-type products may degrade over time with use as a function of their operation. Thus, after a certain amount of time or use, durable welding-type products should be replaced and/or replenished.

SUMMARY

The present disclosure relates generally to welding operations and, more particularly, to systems and methods to provide vendor managed inventory with active tracking inventory, substantially as illustrated by and described in connection with at least one of the figures, as set forth more completely in the claims.

DRAWINGS

The figures are not necessarily to scale. Where appropriate, similar or identical reference numbers are used to refer to similar or identical components.

DETAILED DESCRIPTION

Figure 1A:
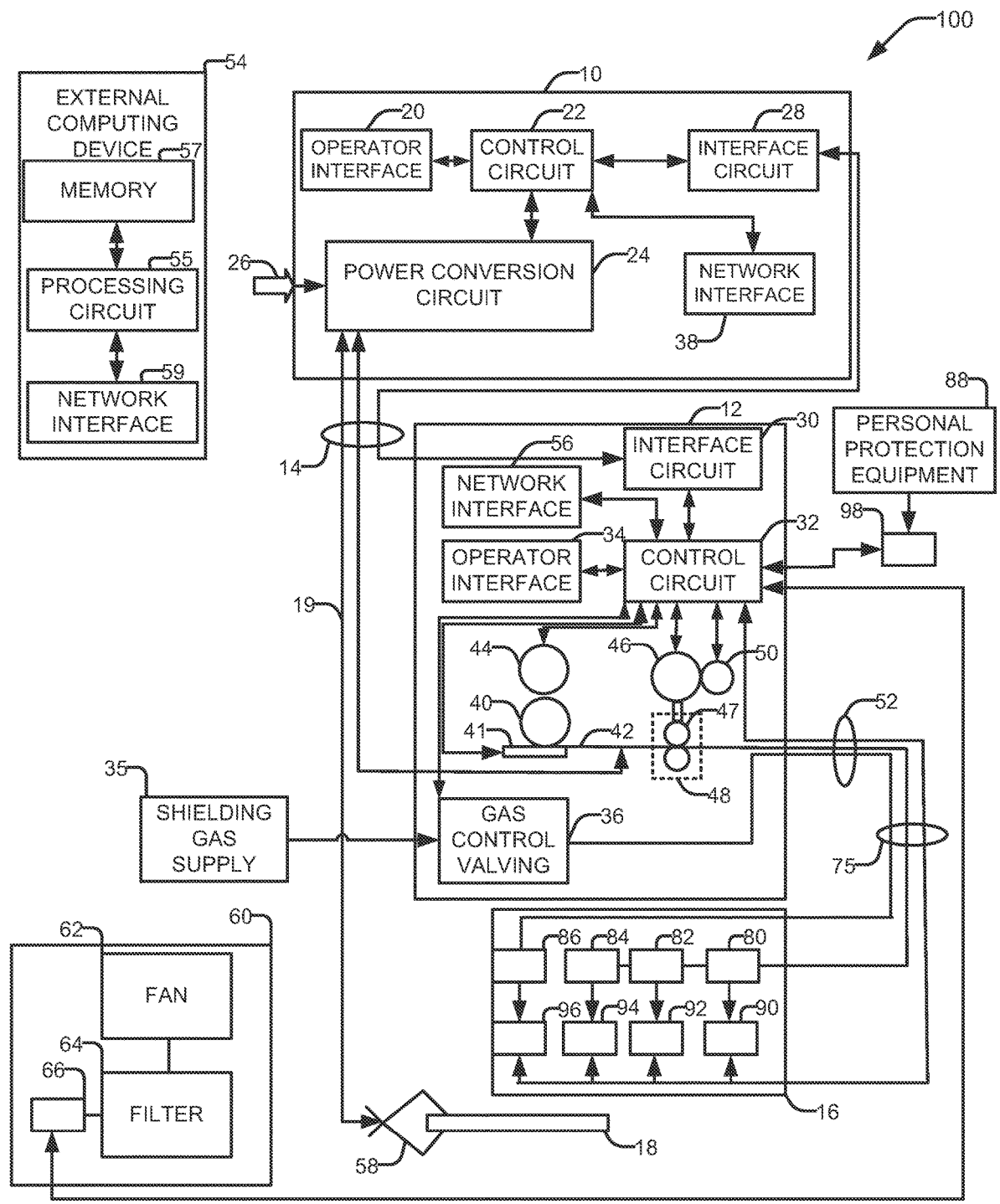
FIG. 1a illustrates a welding-type system employing a consumable tracking system to track the use period of durable welding-type products.

In addition to products that are directly consumed during welding-type operations, some products used with welding-type systems are not directly consumed but have an expected or recommended useful lifetime. As such a product is used in welding-type operations, the product experiences wear and/or other degradation that causes the product to experience incremental and/or sudden decreases in effectiveness for the product's intended function(s). Examples of such durable welding-type products include, without limitation, wire liners, contact tips, gas diffusers, personal protection equipment, welding gun nozzles, welding torches, air filters, and/or tungsten electrodes.

Conventional techniques used to track the consumption of some consumables, include tracking an amount (i.e. a length or a weight) of welding wire, or an amount (i.e., a weight) of shielding gas. However, disclosed example systems and methods track the use period of other, durable welding-type products, such as the durable welding-type products listed above.

As explained in more detail below, the use period of some durable welding-type products (i.e., wire liners, contact tips, welding gun nozzles, gas diffusors, air filters, wire feeder motor rollers, welding torched, tungsten electrodes, personal protection equipment, etc.) may be tracked via tracking a finite consumption of another consumable welding-type product which is more readily tracked (e.g., welding wire, stick electrodes, and/or shielding gas). The present disclosure relates to a system and method for tracking durable welding-type products via detecting the installation of a first durable welding-type product and determining a use period of the first durable welding-type product, where the use period corresponds to a consumed quantity of a first consumable welding-type product or a second durable welding-type product; and tracking the use period of the first durable welding-type product via tracking the consumption of the first consumable welding-type product or the second durable welding-type product.

Disclosed systems for tracking welding-type products include: processing circuitry; and a machine readable storage device including machine readable instructions which, when executed, cause the processing circuitry to: in response to receiving a first signal indicative of installation of a first durable welding product to a welding-type system, reset a variable representative of a use period of the first durable welding product, where the use period corresponds to a consumed quantity of a first consumable welding product; identify a consumption of the first consumable welding product by the welding-type system; and update the variable representative of the use period of the first durable welding product based on the identified consumption of the first consumable welding product.

In some example systems for tracking welding-type products, the first signal is a wireless signal received from a wireless communication device coupled to the first durable welding product.

In some example systems for tracking welding-type products, the wireless signal is one of a radio frequency identification signal, a Bluetooth signal, Bluetooth low energy signal, a near field communication signal, a ZigBee signal, or a RuBee signal.

In some example systems for tracking welding-type products, the first durable welding product is one of a wire liner, a contact tip, a welding gun nozzle, a gas diffuser, a tungsten electrode, a wire feed drive roll, a welding torch, or a fume extraction filter, and the first consumable welding product is at least one of a welding wire electrode or a consumable shielding gas.

In some example systems for tracking welding-type products, the use period of the first durable welding product corresponds to at least one of a weight or a length of the welding wire electrode.

In some example systems for tracking welding-type products, the instructions cause the processing circuitry to: assign a consumption function to at least one of the weight or the length for each of a plurality of welding wire electrode types; determine the welding wire electrode type of the first consumable welding product; and apply the corresponding consumption function to the consumption of welding wire electrode based on the determined welding wire electrode type.

In some example systems for tracking welding-type products, the instructions cause the processing circuitry to update the consumption function for the determined welding wire electrode type in response to receiving a second signal indicating an uninstallation of the first durable welding product from the welding-type system, and the consumption function is updated based on at least one of the weight or the length of welding wire electrode consumed.

In some example systems for tracking welding-type products, the consumption function is based on one or more of a welding voltage, a welding current, a wire feed speed, a wire temperature, or a type of the first durable welding product.

In some example systems for tracking welding-type products, the instruction cause the processing circuitry to: retrieve a stored total use period associated with the first durable welding product; and determine a remaining use period via subtracting the use period from the total use period.

In some example systems for tracking welding-type products, in response to receiving a second signal indicating an uninstallation of the first durable welding product from the welding-type system, the instructions cause the processing circuitry to update the stored total use period of the first durable welding product based on the consumption of the first consumable welding product.

In some example systems for tracking welding-type products, the stored total use period of the first durable welding product is manually set by a user.

In some example systems for tracking welding-type products, in response to receiving a second signal indicating an uninstallation of the first durable welding product from the welding-type system, the instructions cause the processing circuitry to signal an alert if the use period of the first durable welding product is less than the stored total use period of the first durable welding product by at least a threshold amount.

In some example systems for tracking welding-type products, the instructions further cause the processing circuitry to: determine when the use period of the first durable welding product satisfies a threshold; and when the use period satisfies the threshold, at least one of output a second signal, initiate a stopping process of a welding-type process performed by the welding-type system, or prevent the welding-type system from performing a welding-type process.

In some example systems for tracking welding-type products, the instructions cause the processing circuitry to: assign a consumption function to each of a plurality of welding-type processes for the first durable welding product, wherein the welding-type system is configured to perform the plurality of welding-type processes; determine which welding-type process of the plurality of welding type processes the welding-type system is performing; and apply the corresponding consumption function to the consumption of the first consumable welding product based on the determined welding-type process.

In some example systems for tracking welding-type products, the instructions further cause the processing circuitry to transmit the use period of the first durable welding product to an external computing device.

In some example systems for tracking welding-type products, the external computing device is configured to display the use period of the first durable welding product.

In some example systems for tracking welding-type products, the instructions further cause the processing circuitry to determine a representative observed use period based on measured use periods for a plurality of use periods corresponding to a plurality of instances of the first durable welding product.

Disclosed systems for tracking welding-type products include: processing circuitry; and a machine readable storage device including machine readable instructions which, when executed, cause the processing circuitry to: in response to receiving a first signal indicative of installation of a first durable welding product to a welding-type system, reset a variable representative of a use period of the first durable welding product; and in response to receiving a second signal indicative of installation of a second durable welding product to the welding-type system, update the variable representative of the use period of the first durable welding product.

In some example systems for tracking welding-type products, the instructions cause the processing circuitry to: retrieve a recommended use period of the first durable welding product; and determine a remaining use period via subtracting the use period from the recommended use period.

Disclosed systems for tracking welding-type products include: processing circuitry; and a machine readable storage device including machine readable instructions which, when executed, cause the processing circuitry to: in response to receiving a first signal indicative of installation of a first durable welding product to a welding-type system, reset a variable representative of a use period of the first durable welding product, wherein the use period corresponds to a consumed quantity of a second durable welding product; identify a consumed quantity of the second consumable welding product by the welding-type system; and update the variable representative of the use period of the first durable welding product based on the identified consumption of the second durable welding product.

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards, that form part or all of a controller, and are used to control a welding process, a device such as a power source or wire feeder, motion, automation, monitoring, air filtration, displays, and/or any other type of welding-related system.

As used herein, the term "pulsed welding" refers to techniques in which a pulsed power waveform is generated, such as to control deposition of droplets of metal into the progressing weld puddle.

As used herein, the term "boost converter" refers to a power conversion circuit that boosts, or increases, a voltage from an input to an output. For example, a boost converter can be a type of step-up converter, such as a DC-to-DC power converter that steps up voltage while stepping down current from its input (e.g., from the starter battery) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

FIG. 1a illustrates an example welding system 100 for performing welding-type operations. As shown in the welding system 100 of FIG. 1a, a power supply 10 and a wire feeder 12 are coupled via conductors or conduits 14. In the illustrated example, the power supply 10 is separate from the wire feeder 12, such that the wire feeder 12 may be positioned near a welding location at some distance from the power supply 10. However, in some examples the wire feeder 12 may be integrated with the power supply 10. In such cases, the conduits 14 would be internal to the system and/or omitted. In examples in which the wire feeder 12 is separate from the power supply 10 (e.g., remote from the power supply 10, attached to the power supply 10, situated adjacent to the power supply 10, etc.), terminals are typically provided on the power supply 10 and on the wire feeder 12 to allow the conductors 14 or conduits to be coupled to the systems so as to allow for power and gas to be provided to the wire feeder 12 from the power supply 10, and to allow data to be exchanged between the two devices.

The system 100 is configured to provide wire, power and shielding gas to a welding torch 16. The torch 16 may be any type of arc welding torch, (e.g., GMAW, GTAW, FCAW, SMAW) and may allow for the feed of a welding wire 42 (e.g., an electrode wire) and gas to a location adjacent to a workpiece 18. A work cable 19 is run to the welding workpiece 18 so as to complete an electrical circuit between the power supply 10 and the workpiece 18.

The welding system 100 is configured for weld settings (e.g., weld parameters, such as voltage, wire feed speed, current, gas flow, inductance, physical weld parameters, advanced welding programs, pulse parameters, etc.) to be selected by the operator and/or a welding sequence, such as via an operator interface 20 provided on the power supply 10. The operator interface 20 will typically be incorporated into a front faceplate of the power supply 10, and may allow for selection of settings such as the weld process, the type of wire to be used, voltage and current settings, and so forth. In particular, the example system 100 is configured to allow for welding with various steels, aluminums, or other welding wire that is channeled through the torch 16. Further, the system 100 is configured to employ welding wires with a variety of cross-sectional geometries (e.g., circular, substantially flat, triangular, etc.). These weld settings are communicated to a control circuit 22 within the power supply 10. The system may be particularly adapted to implement welding regimes configured for certain electrode types.

The control circuit 22, operates to control generation of welding power output that is supplied to the welding wire 42 for carrying out the desired additive manufacturing operation.

The torch 16 applies power from the power supply 10 to the wire electrode 42, typically by a welding cable 52. Similarly, shielding gas from a shielding gas supply 35 is fed through the wire feeder 12 and the welding cable 52. During welding operations, the welding wire 42 is advanced through a jacket of the welding cable 52 towards the torch 16.

The work cable 19 and clamp 58 allow for closing an electrical circuit from the power supply 10 through the welding torch 16, the electrode (wire) 42, and the workpiece 18 for maintaining the welding arc during the operation.

The control circuit 22 is coupled to power conversion circuit 24. This power conversion circuit 24 is adapted to create the output power, such as pulsed waveforms applied to the welding wire 42 at the torch 16. Various power conversion circuits may be employed, including choppers, boost circuitry, buck circuitry, inverters, converters, and/or other switched mode power supply circuitry, and/or any other type of power conversion circuitry. The power conversion circuit 24 is coupled to a source of electrical power as indicated by arrow 26. The power applied to the power conversion circuit 24 may originate in the power grid, although other sources of power may also be used, such as power generated by an engine-driven generator, batteries, fuel cells or other alternative sources. The power supply 10 illustrated in FIG. 1a may also include an interface circuit 28 configured to allow the control circuit 22 to exchange signals with the wire feeder 12.

The wire feeder 12 includes a complimentary interface circuit 30 that is coupled to the interface circuit 28. In some examples, multi-pin interfaces may be provided on both components and a multi-conductor cable run between the interface circuit to allow for such information as wire feed speeds, processes, selected currents, voltages or power levels, and so forth to be set on either the power supply 10, the wire feeder 12, or both. Additionally or alternatively, the interface circuit 30 and the interface circuit 28 may communicate wirelessly and/or via the weld cable.

The wire feeder 12 also includes control circuit 32 coupled to the interface circuit 30. As described below, the control circuit 32 allows for wire feed speeds to be controlled in accordance with operator selections or stored sequence instructions, and permits these settings to be fed back to the power supply via the interface circuit. The control circuit 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuit 32 may also be coupled to gas control valving 36 which regulates and measures the flow of shielding gas from the shielding gas supply 35 to the torch 16. In general, such gas is provided at the time of welding, and may be turned on immediately preceding the weld and for a short time following the weld. The shielding gas supply 35 may be provided in the form of pressurized bottles.

The wire feeder 12 includes components for feeding wire to the welding tool 16 and thereby to the welding application, under the control of control circuit 32. For example, one or more spools of welding wire 40 are housed in the wire feeder. Welding wire 42 is unspooled from the spool 40 and is progressively fed to the torch 16. The spool may be associated with a clutch 44 that disengages the spool when wire is to be fed to the tool. The clutch 44 may also be regulated to maintain a minimum friction level to avoid free spinning of the spool 40. The first wire feeder motor 46 may be provided within a housing 48 that engages with wire feed rollers 47 to push wire from the wire feeder 12 towards the torch 16.

In practice, at least one of the rollers 47 is mechanically coupled to the motor and is rotated by the motor to drive the wire from the wire feeder, while the mating roller is biased towards the wire to apply adequate pressure by the two rollers to the wire. Some systems may include multiple rollers of this type. A tachometer 50 or other sensor may be provided for detecting the speed of the first wire feeder motor 46, the rollers 47, or any other associated component so as to provide an indication of the actual wire feed speed. Signals from the tachometer 50 are fed back to the control circuit 32 such that the control circuit 32 can track the length of wire that has been fed. The length of wire may be used directly to calculate consumption of the wire and/or other welding products, and/or the length may be converted to wire weight based on the type of wire and its diameter. The control circuit 32 may also track the wire type (geometry, material and/or gauge). In some examples, the wire feeder 12 includes a scale 41 to measure the weight of the wire spool 40. Signals from the scale 41 are fed back to the control circuit 32 such that the control circuit 32 can track a consumption of welding wire by weight.

Other system arrangements and input schemes may also be implemented. For example, the welding wire may be fed from a bulk storage container (e.g., a drum) or from one or more spools outside of the wire feeder. Similarly, the wire may be fed from a "spool gun," in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting. In such systems, a tachometer 50 or scale 41 may track the amount of welding wire fed.

Other techniques may be used to track the actual wire feed speed, the length of welding wire fed by the wire feeder 12, and/or the remaining welding wire on a wire package, any of which may be used to determine an amount of wire consumed by welding operations. Example techniques that may be used are described in U.S. Pat. No. 7,335,854 (Hutchison), U.S. Pat. No. 8,658,941 (Albrecht), and/or U.S. Pat. No. 9,403,234 (Christopher, et al). The entireties of U.S. Pat. Nos. 7,335,854, 8,658,941, and 9,403,234 are incorporated herein by reference.

The torch 16 includes a wire liner 80, a contact tip 82, a nozzle 84, and a shielding gas diffusor 86. The torch includes sensors 90, 92, 94, and 96 which can detect when a wire liner 80, a contact tip 82, a nozzle 84, or a gas diffusor 86, respectively, is uninstalled or installed to the torch 16. For example, the sensor 90 can detect when a wire liner is installed to the torch 16 or uninstalled from the torch. Each sensor 90, 92, 94, 96 communicates with the control circuit 32 such that the sensors send signals to the control circuit 32 indicating when one of the wire liner 80, the contact tip 82, the nozzle 84, or the shielding gas diffusor 86 is installed to or uninstalled from the torch 16.

The system 100 may also include a fume evacuator 60 to evacuate fumes created by a welding-type process. The fume evacuator 60 includes a fan 62 and a replaceable air filter 64. A sensor 66 detects when the air filter 64 is installed to the fume evacuator and uninstalled from the fume evacuator. The sensor 66 communicates with the control circuit 32 such that the sensor can send signals to the control circuit 32 indicating when the air filer 64 is installed to and uninstalled from the fume evacuator 60.

In some examples, the sensors 66, 90, 92, 94, 96 include bar code scanners (or QR code scanners), and the durable welding-type products: the air filter 64, the wire liner 80, the contact tip 82, the nozzle 84, and the gas diffusor 86, each have bar codes (or QR codes). When installed, the bar code (or QR code) on the durable welding-type product 64, 80, 82, 84, 86, is scanned by the respective bar code (or QR code) scanner 66, 90, 92, 94, 96. The bar code (or QR code) may include information regarding the useful life (i.e., recommended or expected use period) of the durable welding-type product 64, 80, 82, 84, 86 (for example, measured in inches of wire fed). When scanned, the sensor 66, 90, 92, 94, 96 sends a signal to the control circuit 32 indicating that the durable welding-type product 64, 80, 82, 84, 86 has been installed and indicating the useful life of the durable welding-type product 64, 80, 82, 84, 86. In some examples, the sensors 66, 90, 92, 94, 96 may be optical sensors, magnetic sensors, electrical sensors, mechanical sensors, or touch-type sensors which can detect the physical presence of the durable welding-type product 64, 80, 82, 84, 86. In such examples, the control circuit 32 detects an uninstallation when the sensor newly detects the absence of the durable welding-type product 64, 80, 82, 84, 86 and the control circuit 32 detects the installation of the durable welding-type product 64, 80, 82, 84, 86 when the sensor newly detects the presence of the durable welding-type product 64, 80, 82, 84, 86.

In some examples, the sensors 66, 90, 92, 94, 96 may be wireless receivers or transceivers which receive a wireless signal from the durable welding-type products 64, 80, 82, 84, 86. For example, the sensors 66, 90, 92, 94, 96 may be radio frequency identification ("RFID") readers which reach a RFID tag on the durable welding-type products 64, 80, 82, 84, 86. The RFID tag may also include information such as the stock number, size, model, or useful life (i.e., recommended, expected, or stored use period) of the durable welding-type product 64, 80, 82, 84, 86, which the sensors 66, 90, 92, 94, 96 can communicate to the control circuit 32. Other possible wireless technologies that the sensors may use include Bluetooth, Bluetooth low energy, near field communication, ZigBee, RuBee, or the like. In some cases, a user may uninstall and then reinstall the same durable welding-type product. For example, a user, may uninstall a nozzle 84 from a torch 16 to clean the nozzle 84, and then reinstall the cleaned nozzle onto the torch 16. When the durable welding-type product is reinstalled, the sensor recognizes the RFID tag (or other wireless tag) and can then continue tracking the use period of the particular durable welding-type product. When a life-extending action such as cleaning or applying anti-spatter spray is used, the consumption function of the durable welding-type products may be adjusted. One common cleaning method is accomplished automatically with the use of a reamer as offered by Tregaskiss. A reamer removes spatter from welding gun consumables. Use of an anti-spatter spray may also influence the life of durable welding-type consumables.

Although illustrated as separate sensors 90, 92, 94, 96, in some examples a single sensor in the torch 16 may sense the installation and uninstallation of multiple components of the torch 16. For example, a single RF wireless receiver (RFID reader, NFC scanner, Bluetooth receiver, or the like), associated with the torch 16 may detect the installation and uninstallation of two or more of the wire liner 80, the contact tip 82, the nozzle 84, or the gas diffusor 86.

A sensor may also detect the installation and uninstallation of wire feed rollers 47. Similarly, a sensor 98 may be used to detect the use of personal protection equipment 88 (e.g., a welding helmet or welding gloves). For example, the sensor 98 may be a bar code scanner or a wireless transceiver as described above. Before an operator operates the welding system 100, the operator may scan their personal protection equipment 88. For example, the personal protection equipment may include a wireless tag (RF, RFID, Bluetooth, Zigbee Ultra-wideband, or the like), including information regarding the useful lifetime of the personal protection equipment. The control circuit then receives a signal from the sensor 98 including information regarding the useful life of the personal protection equipment (for example, in inches of wire fed). Then as the operator operates the system 100, the control circuit tracks the amount of wire fed and, as a function of the tracked wire feeding, and calculates use period and the remaining expected/recommended use period of the personal protection equipment 88. The remaining expected/recommended use period may correspond to the actual use period subtracted from an initial stored expected/recommended use period. When the operator completes the welding-type operation, the operator can scan the personal protection equipment 88 with the sensor 98 again, at which time the sensor 98 can write to the RFID tag on the personal protection equipment to store a variable representative of the use period and/or remaining expected/recommended use period of that particular personal protection equipment. The operator interface 34 may also display to the operator the use period and/or the remaining expected/recommended use period of the personal protection equipment 88. Similarly, the sensor 98 may be used to scan the torch 16 to detect an initial useful life (i.e., a stored expected or recommended use period) of the torch 16 and then track consumption of the useful life of the torch 16 (based, for example on the amount of wire fed).

If the use period of the personal protection equipment 88, the torch 16, or any of the other durable welding-type products 47, 64, 80, 82, 84, 86, falls exceeds a threshold during a welding operation, the system may signal an alert to the operator, for example via the operator interface 34, or to the supervisor via a network, cloud, or cellular connection.

Similarly, in some examples, the use period of a first durable welding-type product may be tracked based on the consumption or a second durable welding-type product. For example, the use period of a torch 16 may be tracked based on the amount the times the contact tip 82 of the torch 16 has been replaced. As an example, if the contact tip 82 of a torch 16 has been replaced ten times, the system may signal an alert to the operator, for example via the operator interface 34, that the torch 16 should also be replaced.

The system 100 includes an external computing device 54, which may be for example, a local server, a local computer, a remote computer, an application in a fog network, or an application running on cloud infrastructure. The external computing device includes a processing circuit 55, memory 57, and a network interface 59. The power supply 38 has a network interface 38 communicatively connected to the control circuit 22. The network interface 38 may include an internet connection, for example a WI-FI transceiver such that the control circuit 22 of the power supply 12 can communicate with the external computing device 54 via the network interface 59 of the external computing device. Similarly, the wire feeder 12 has a network interface 56 communicatively connected to the control circuit 32. The network interface 56 may include an internet connection, for example a WI-FI transceiver, such that the control circuit 32 of the wire feeder 12 can communicate with the external computing device 54. As such, data from the sensors 66, 90, 92, 94, 96, 98, the tachometer 50, the scale 41, and other data may be sent from the control circuit 32 to the external computing device 54, for example to a database stored in cloud infrastructure. In some examples, data from the sensors 66, 90, 92, 94, 96, 98 may be sent directly from the sensors 66, 90, 92, 94, 96, 98 to the external computing device 54.

In some examples, the external computing device 54 computes the use period and/or remaining expected/recommended use period of the durable welding-type products 16, 47, 64, 80, 82, 84, 86, 88. The external computing device 54 may also keep track of data such as the amount of wire fed between when each durable welding-type product 16, 47, 64, 80, 82, 84, 86, 88 is installed and uninstalled. Thus, the external computing device may learn the useful lifetime (i.e., expected or recommended use period) of various durable welding-type products 16, 47, 64, 80, 82, 84, 86, 88 based on the amount of wire fed (or amount of shielding gas used) between the time when the durable welding-type product 16, 47, 64, 80, 82, 84, 86, 88 is installed and uninstalled. This learned amount may be referenced to set thresholds for later use. The system may be commanded to be in a teach or learn mode vs. a run mode while learning a new amount. In a learn mode, previous thresholds and/or alerts may be ignored or disabled. In some examples, the use period and/or remaining expected/recommended use period of a durable welding-type product 16, 47, 64, 80, 82, 84, 86, 88 may be determined by the control circuit 22 of the power supply 10 or the control circuit 32 of the wire feeder 12 and then transmitted to the external computing device 54. The external computing device 54 can then store the use period and/or expected/recommended use period of the durable welding-type product 16, 47, 64, 80, 82, 84, 86, 88 in memory 57 and display the use period and/or remaining expected/recommended use period at the external computing device 54.

In some examples, the system 100 may also track the type of wire used (i.e. geometry, gauge and material) and the particular welding process (i.e., short circuit, spray, pulsed, reciprocating wire feed, custom) and assign consumption functions if a particular wire type or welding process causes an operator to replace the durable welding-type product 16, 47, 64, 80, 82, 84, 86, 88 more or less frequently (i.e., with more or less wire being fed). In some examples, the consumption function may be a constant. In some examples, the consumption function may be nonlinear functions. The consumption functions may also be based on one or more of a welding voltage, a welding current, a power, a wire feed speed, a wire temperature, or a type of the first durable welding product.

In some examples, the system may also track the type of installed durable welding-type products 16, 47, 64, 80, 82, 84, 86, 88 based on information received from the sensors 66, 90, 92, 94, 96, 98 (i.e. information scanned from a bar code, QR code or RFID tag). The control circuit 32, 22, or processing circuit 55 may compare the installed welding-type products to a welding-type process or process parameters selected by an operator or automatically set by a controller to determine whether the durable welding-type products 16, 47, 64, 80, 82, 84, 86, 88 are compatible with the selected welding-type process or parameters. If the durable welding-type products 16, 47, 64, 80, 82, 84, 86, 88 are not compatible with the selected welding-type process or parameters, then the system may signal an alert to the operator, for example via the operator interface 20 of the power supply and/or the operator interface 34 of the wire feeder.

Figure 1B:
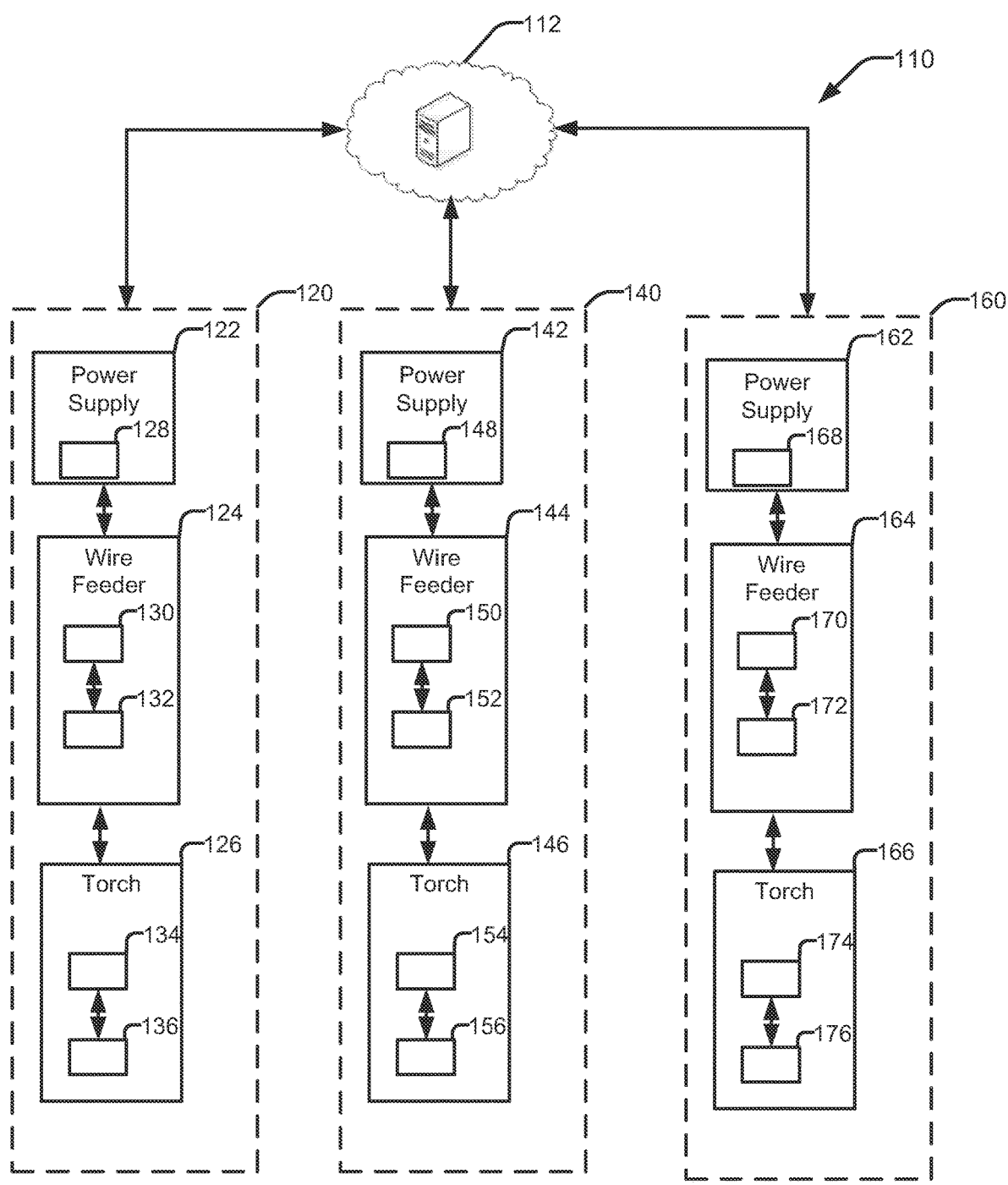
FIG. 1B illustrates a block diagram of a system employing a consumable tracking system to track the use period of durable welding-type products at multiple welding cells.

FIG. 1b illustrates an example system 110 employing a system for tracking consumables and durable welding-type products at multiple weld cells 120, 140, 160. The system 110 includes a computing device 112 for tracking the consumption of consumables and durable welding-type products at the multiple weld cells 120, 140, and 160 of the system 110. The example computing device 112, which may be similar or identical to the external computing device 54 of FIG. 1a, is communicatively connected to control circuitry of the weld cells 120, 140, and 160 such that the computing device 112 receives information relating to the consumption of consumables and/or the use period of durable welding-type products at each of the weld cells 120, 140, and 160. In some examples, the computing device 112 may be an application and database operating on a fog network or cloud infrastructure. In some examples, the computing device 112 may be a server on a local area network. The weld cells 120, 140, and 160 may communicate with the computing device 112 via one or more wired and/or wireless data connections.

Each of the weld cells 120, 140, and 160 may include the components of and operate as described with respect to the system 100 of FIG. 1a. Thus, as illustrated, weld cell 120 includes a power supply 122, a wire feeder 124, a welding torch 126, and control circuitry 128. Weld cell 140 includes a power supply 142, a wire feeder 144, a welding torch 146, and control circuitry 148. Weld cell 160 includes a power supply 162, a wire feeder 164, a welding torch 166, and control circuitry 168. Although illustrated as contained in the power supply (122, 142, 162), the control circuitry (128, 148, 168) for each weld cell may also be included in the wire feeder (124, 144, 164), or in another dedicated computing device that monitors and/or controls the operation of each of the respective weld cells (120, 140, 160).

As described with respect to FIG. 1a, each wire feeder 124, 144, and 164 feeds wire from a wire spool (130, 150, 170) to the welding torch (126, 146, 166). A sensor (132, 152, 172) measures the feeding of wire from the wire feeder (124, 144, 164). The sensor may be, for example, a tachometer which measures the speed at which the wire is fed, or a scale which measures the change in weight of the wire spool (130, 150, 170). A signal from the sensor (132, 152, 162) representative of the consumption of wire is sent to the control circuitry (128, 148, 168). The data representative of the amount of wire consumed may then be transmitted to the computing device 112 where the data can be further processed and stored. Although described as monitoring the consumption of welding wire, as described with respect to FIG. 1a, in some examples, the system 110 may also track the consumption of shielding gas.

The torch (126, 146, 166) of each weld cell (120, 140, 160) contains one or more sensors (134, 156, 174) to detect the installation and uninstallation of durable components of the torch (136, 156, 176), for example a contact tip, a wire liner, a shielding gas nozzle, a gas diffusor, as described with respect to FIG. 1a. The sensor (134, 154, 174) sends a signal to the control circuitry of the weld cell (128, 148, 168) indicating when the durable component (136, 156, 176) is installed or uninstalled. The control circuitry (128, 148, 168), then transmits the information that the component has been installed or uninstalled to the computing device 112 to be processed and stored. As described above with respect to FIG. 1a, each of the weld cells (120, 140, 160) may also track the installation and/or uninstallation of various other components of the welding cells, for example the torch (126, 146, 166), wire feeder motor rollers, fume evacuation filters, and personal protection equipment.

The computing device 112 receives, processes, and stores the data regarding the consumption of wire and/or gas and the installation and uninstallation of the various durable products from each of the weld cells 120, 140, and 160. The computing device 112 can track the use period of the various durable products of the weld cells via processing the data regarding the installation of each of the various durable products and the amount of shielding gas or wire consumed since the installation of each of the durable products. The computing device 112 may then alert operators of the weld cells 120, 140, 160 when a component of the weld cell (120, 140, 160) should be replaced (i.e., when the use period of the particular component exceeds a recommended threshold use period). In some examples, the computing device 112 may order a replacement component when the use period of a certain component is exceeds a threshold.

In some examples, the use period of a durable welding-type product may be monitored by tracking the replacement of other durable welding-type products. For example, the use period of a torch 16 may be tracked by monitoring the installation and uninstallation of durable components of the torch, for example the contact tip 82 nozzle 84, and/or diffusor 86. For example, the computing device 112 may track the number of time the contact tip 82 of a torch 16 has been replaced. After the contact tip 82 of a torch 16 has been replaced a threshold number of times (e.g., 10), the computing device may signal an alert that the torch 16 should be replaced and/or order a new torch 16.

When monitoring multiple weld cells 120, 140, 160, multiple power supplies 122, 142, 162, and/or multiple operators, the example computing device 112 may aid in procurement planning and inventory management. For example, the computing device 110 may analyze the consumption patterns by weld cell, power supply, and/or operator, compare the consumption patterns against remaining inventory, and/or initiate orders for consumable and/or durable products based on expected shortfalls and/or requirements. In some examples, the computing device 112 may weight consumption data by a subset of operators, equipment, or weld cells more heavily than other operators, equipment, or weld cells, based on operator experience and/or qualifications, known condition of the weld equipment, and/or other factors.

Additionally or alternatively, the computing device 112 may identify outliers, such as operators who change durable welding-type products more or less frequently than tracking of the durable welding-type products would suggest is necessary. For example, if an operator or weld cell experiences changes in contact tips more frequently than other operators, the computing device 112 may flag the operator or weld cell for investigation. For instance, the operator may be using poor technique, installing and/or using the contact tip or other equipment incorrectly, and/or simply replacing contact tips or other durable welding-type products before replacement is warranted.

Figure 2:
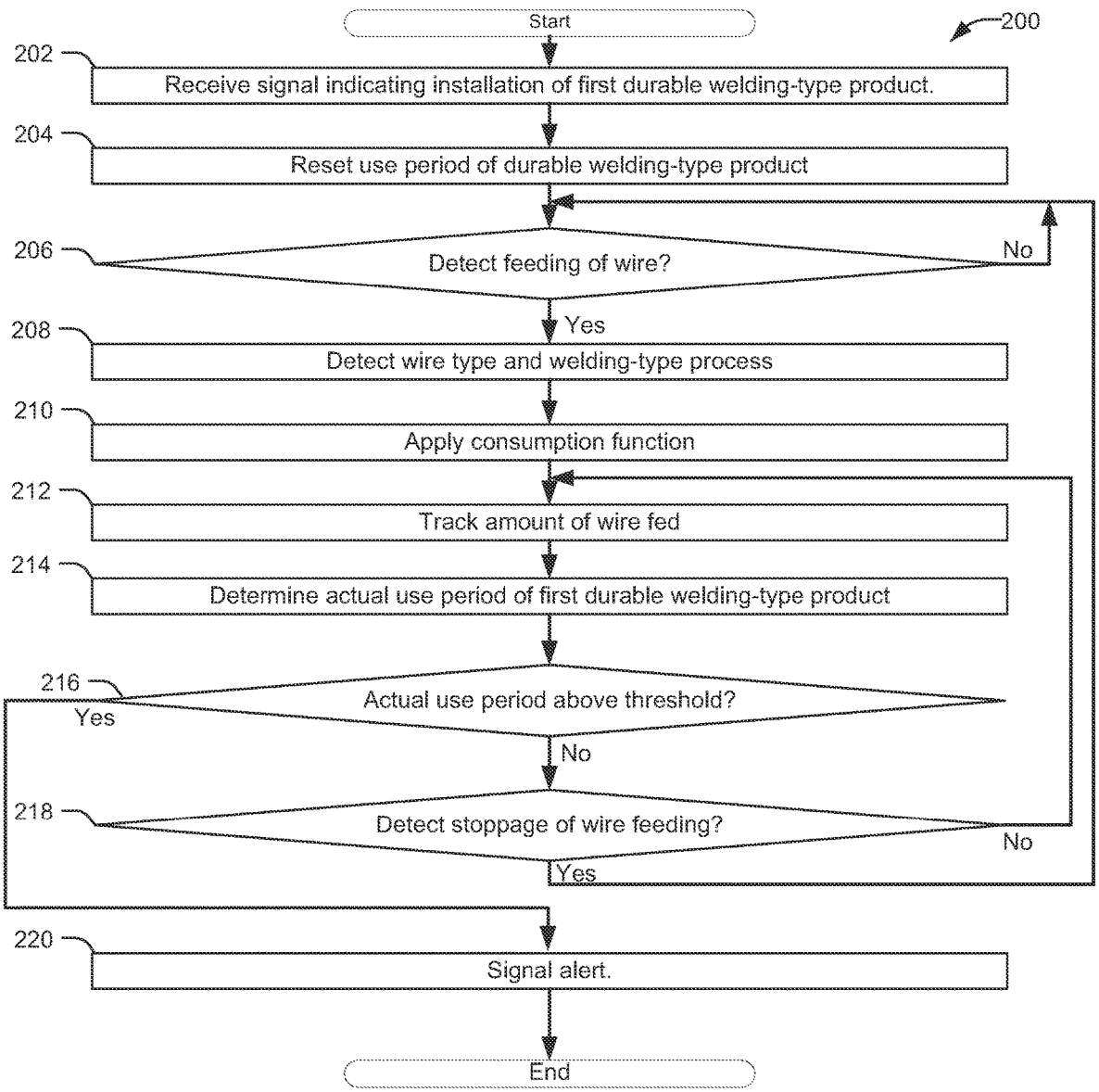
FIG. 2 is a flow chart representative of example machine readable instructions which may be executed by the welding-type system of FIG. 1a to track the use period of various durable welding-type products.

FIG. 2 is a flow chart representative of example machine readable instructions 200 which may be executed by the system 100 of FIG. 1a to track the use period of a durable welding-type product. The machine readable instructions 200 may be partially or completely implemented by the control circuit 22 or 32 or processing circuit 55 of FIG. 1a.

At block 202, the control circuit 22 receives a signal indicating the installation of a durable welding-type product. The signal may originate from a sensor, such as sensors 66, 90, 92, 94, 96, or 98. The durable welding-type product could be any of an air filter 64, a wire liner 80, a welding torch nozzle 84, a contact tip 82, a gas diffusor 86, wire feeder motor rollers 47, a tungsten electrode (i.e., of a tungsten inert gas welding torch), a welding torch 16, personal protection equipment 88 (i.e., welding gloves or welding helmet) or any other product with a limited use period used with welding-type systems and/or processes. As described above with reference to FIG. 1a, the sensor (66, 90, 92, 94, 96, or 98) may be a touch-type sensor, magnetic sensor, optical sensor, a bar code reader, a QR reader, or a wireless transceiver (i.e. a RFID transceiver). If the sensor (66, 90, 92, 94, 96, or 98) is a bar code reader, QR reader, or a wireless transceiver, then the first durable welding-type product may include a tag (i.e., a bar core, QR code, RF tag, Near Field Communication tag, Bluetooth beacon, RF transmitter, RFID tag, etc.) including information for the sensor to read. The tag may include the durable welding-type product type information including recommended use period information. Use period is described as an amount of welding wire fed and/or other trackable parameters of the welding-type system, for example a total operational time of the welding-type system or an amount of shielding gas used.

At block 204, in response to receiving the signal indicating the installation of the new first durable welding-type product, the control circuit 22 resets a variable indicative of the use period of the first durable welding-type product. In some examples, the initial recommended use period of the first durable welding-type product is stored in memory of the control circuit 22. In some examples, the sensor (66, 90, 92, 94, 96, or 98) may scan a tag on the first durable welding-type product which includes recommended use period information, and the sensor sends that scanned information to the control circuit 22. In some cases, a user or machine may uninstall and then reinstall the same durable welding-type product. For example a user or reaming machine may uninstall a nozzle 84 from a torch 16 to clean the nozzle 84, and then reinstall the cleaned nozzle onto the torch 16. When the durable welding-type product is reinstalled, the sensor recognizes the RFID tag (or other data tag) of the previously installed durable welding type product, and can then continue tracking the use period of the particular durable welding-type product. In other words, the control circuit 22 does not reset the use period for the first durable welding-type product when a particular previously installed durable welding-type product is reinstalled.

At block 206, the control circuit 22 monitors whether any welding wire has been fed by the wire feeder 12, for example via monitoring signals from a tachometer 50 connected to the wire feed motor 46. If the control circuit 22 detects that the wire feeder 12 is feeding welding wire (block 206), then at block 208, the control circuit 22 detects the wire type (i.e. gauge, geometry, and/or material) and the welding-type process (i.e. constant current, spray, pulsed, voltage, current, etc.) The wire type and welding-type process may be detected based on operator inputs, for example based on the way that the operator configured the system for the particular welding-type process.

At block 210, the control circuit 22 applies consumption functions to the consumption of welding wire based on the detected wire type and welding-type process. Some welding wire types and welding processes may cause durable welding-type products to degrade more or less quickly, and therefore a consumption function may be applied to the tracked amount of wire that corresponds to the use period of the durable welding-type product. For example, a steel welding wire may degrade a wire liner 80 more quickly than an aluminum welding wire. Therefore, if a wire liner 80 is the first durable welding-type product, a steel welding wire would be assigned a consumption function that aggregates faster than an aluminum welding wire. Similarly, a pulsed welding-type process may degrade a contact tip 82 more quickly than a spray welding-type process, and therefore if the contact tip 82 is the first durable welding-type product, then a pulsed welding-type process may be assigned a consumption function that aggregates faster that a spray welding-type process. The consumption functions may be stored in memory of the control circuit 22. For example, the memory may include a database with a table that has consumption functions corresponding to each durable welding-type product and wire-types and welding-type processes. The consumption functions may be set by an operator, or learned as described below with reference to FIG. 4. The consumption function may be constants or nonlinear functions. The consumption functions may also be based on one or more of a welding voltage, a welding current, a wire feed speed, a wire temperature, or a type of the first durable welding product.

At block 212, the control circuit 22 monitors the amount of welding wire fed. In some examples, the control circuit 22 may receive a signal from a tachometer 50 connected to a wire feed motor 46 which is indicative of the length of welding wire fed. In some examples, a scale may monitor changes in the weight of the wire spool to detect an amount (i.e., a weight) of wire fed.

At block 214, the control circuit 22 determines the use period by multiplying the tracked amount of wire fed since the installation of the first durable welding-type product by the consumption functions.

At block 216, the control circuit 22 compares the use period to a threshold. The threshold is a recommended use period for the durable welding-type product. If the use period is above the threshold (block 216), then at block 218, the control circuit 22 monitors for the stoppage of wire feeding. If the control circuit 22 detects that the wire feeder 12 is still feeding welding wire (block 218), then the control circuit 22 returns to block 212 to continue monitoring the consumption of welding wire and the use period of the first durable welding-type product. If the control circuit 22 detects that the wire feeder 12 is no longer feeding welding wire (block 218), then the control circuit 22 returns to block 206 to monitor for the feeding of welding wire.

If the use period is above the threshold (block 216), then at block 220, the control circuit 22 signals an alert. The control circuit 22 may display a visual alert to the operator, for example via the operator interface 34 of the wire feeder 12 or the operator interface 20 of the power supply 10. In some examples, after the alert, the control circuit 22 may initiate a hard stop of the welding-type system, i.e., the control circuit 22 can stop the ongoing operation of any welding-type process being performed by the welding-type system. In some examples, the control circuit 22 may prevent the welding-type system from performing a welding-type process until a new durable welding-type product is installed to the welding-type system. In some examples, the control circuit 22 may automatically order a new durable welding-type product from a supplier when the use period of the durable welding-type product is above the threshold.

Figure 3:
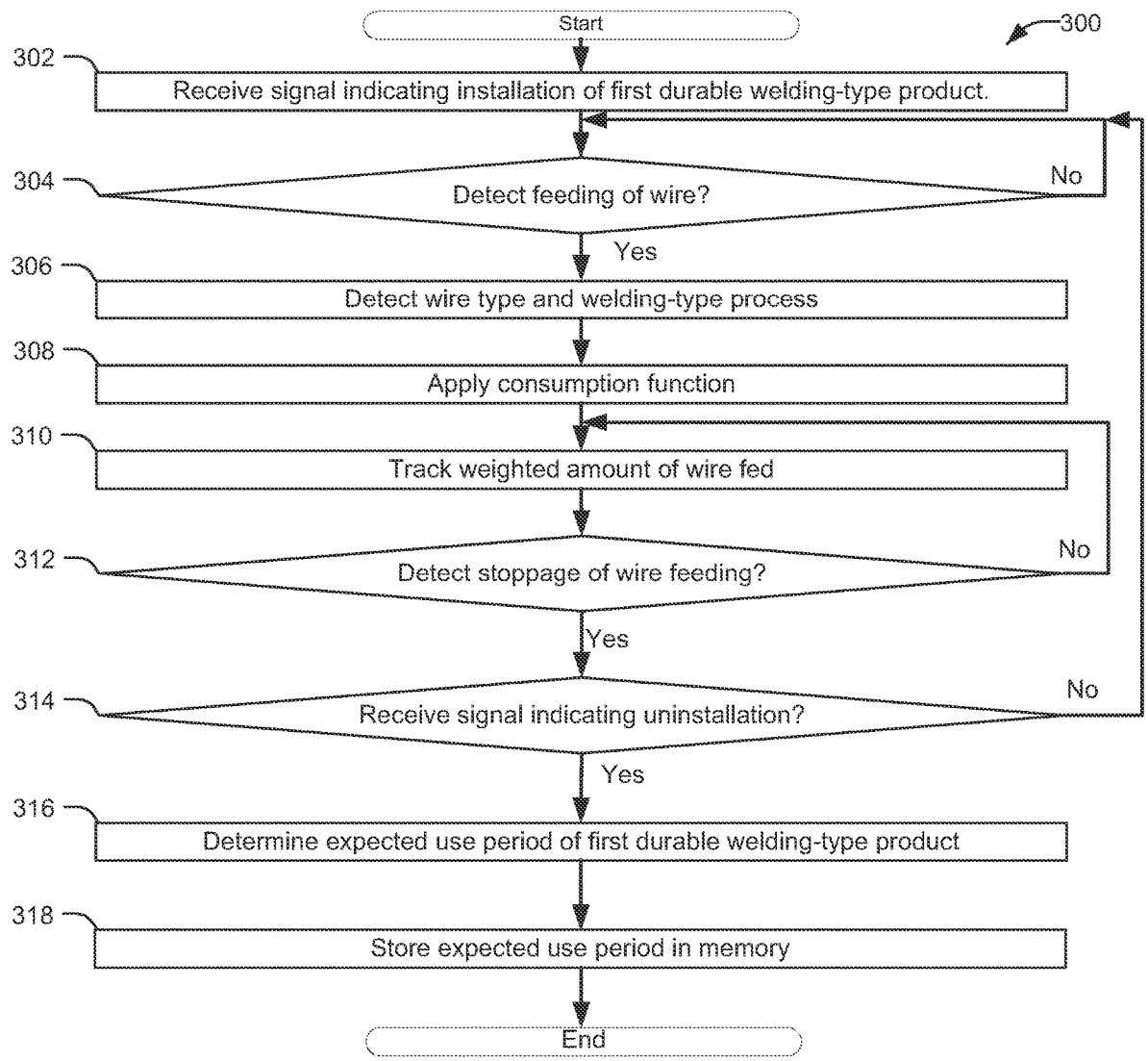
FIG. 3 is a flow chart representative of example machine readable instructions which may be executed by the welding-type system of FIG. 1a to determine an initial expected use period of a durable welding-type product.

FIG. 3 is a flow chart representative of example machine readable instructions 300 which may be executed by the system 100 of FIG. 1a to determine a recommended use period of a durable welding-type product. The machine readable instructions 300 may be partially or completely implemented by the control circuit 22 or 32 or processing circuit 55 of FIG. 1a.

At block 302, the control circuit 22 receives a signal indicating the installation of a first durable welding-type product and sets a variable indicative of the amount of welding wire fed during the lifetime of the first durable welding-type product to zero. At block 304, the control circuit 22 monitors whether any welding wire has been fed by the wire feeder 12, for example via monitoring signals from a tachometer 50 connected to the wire feed motor 46. If the control circuit 22 detects that the wire feeder 12 is feeding welding wire (block 304), then at block 306, the control circuit 22 detects the wire type (i.e. gauge, geometry, and/or material) and the welding-type process (i.e. constant current, spray, pulsed, voltage, current, etc.).

At block 308, the control circuit 22 applies consumption functions to the consumption of welding wire based on the welding wire type and the welding-type process, as described with reference to block 210 of method 200 of FIG. 2. At block 310, the control circuit 22 tracks the weighted amount of welding wire fed by multiplying the tracked amount of welding wire fed by the consumption functions for the fed welding wire. At block 312, the control circuit 22 monitors for the stoppage of wire feeding. If the control circuit 22 detects that the wire feeder 12 is still feeding welding wire (block 312), then the control circuit 22 returns to block 310 to continue monitoring the feeding of welding wire.

If the control circuit 22 detects that the wire feeder 12 is no longer feeding welding wire (block 312), then the control circuit 22 checks at block 314 whether the control circuit 22 has received a signal indicating that the first durable welding-type product has been uninstalled. If the first durable welding-type product has not been uninstalled (block 314), then the control circuit 22 returns to block 304 to continue to monitor whether welding wire is fed by the wire feeder 12. If the first durable welding-type product has been uninstalled (block 314), then at block 316 the control circuit 22 determines the expected/recommended used period of the first durable welding-type product based on the tracked weighted amount of wire fed calculated in block 310. At block 318, the expected/recommended use period is stored in memory of the control circuit 22, to be used for example, as the threshold in block 216 of the method 200 of FIG. 2. In some examples, method 300 may be run multiple times, and the determined recommended use period of the first durable welding-type product is a statistical average (or median, or other filtered result) calculated based on the various results obtained in block 310 of each run of method 300. Accordingly, in some examples, the expected/recommended use period stored in memory may be updated after each time a first durable welding-type product is uninstalled, based on the weighted tracked amount of welding wire fed (block 310). In other words, the control circuit 22 may determine a representative observed use period based on measured use periods for a plurality of use periods corresponding to a plurality of instances of the first durable welding product.

Figure 4:
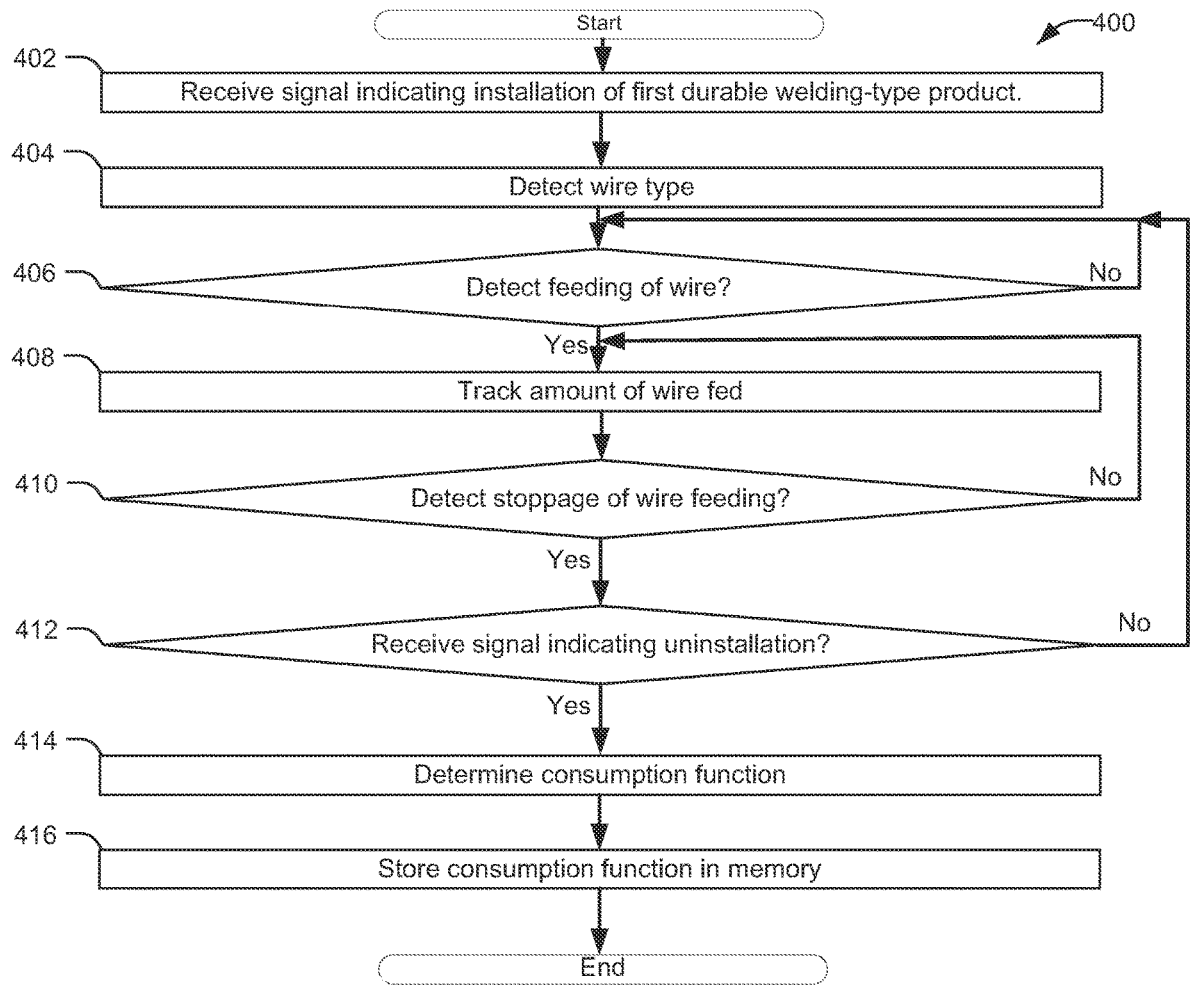
FIG. 4 is a flow chart representative of example machine readable instructions which may be executed by the welding-type system of FIG. 1a to determine a consumption function for a particular wire type used with the welding-type system of FIG. 1.

FIG. 4 is a flow chart representative of example machine readable instructions 400 which may be executed by the system 100 of FIG. 1a to determine a consumption function for a durable welding-type product based on welding wire type. The method 400 may also be used to determine the consumption function for a durable welding-type product based on a welding-type process. The machine readable instructions 300 may be partially or completely implemented by the control circuit 22 or 32 or processing circuit 55 of FIG. 1a.

At block 402, the control circuit 22 receives a signal indicating the installation of a first durable welding-type product and sets a variable indicative of the amount of welding wire fed during the lifetime of the first durable welding-type product to zero. At block 404, the control circuit 22 detects the wire type. At block 406, the control circuit monitors whether any welding wire has been fed by the wire feeder 12, for example via monitoring signals from a tachometer 50 connected to the wire feed motor 46. If the control circuit 22 detects that the wire feeder 12 is feeding welding wire (block 406), then at block 408, the control circuit 22 tracks the amount of welding wire than has been fed.

At block 410, the control circuit 22 monitors for the stoppage of wire feeding. If the control circuit 22 detects that the wire feeder 12 is still feeding welding wire (block 410), then the control circuit 22 returns to block 408 to continue monitoring the feeding of welding wire.

If the control circuit 22 detects that the wire feeder has stopped feeding welding wire (block 410), then at block 412 the control circuit 22 checks whether the control circuit 22 has received a signal indicating that the first durable welding-type product has been uninstalled. If the first durable welding-type product has not been uninstalled (block 412), then the control circuit 22 returns to block 406 to continue to monitor whether welding wire is fed by the wire feeder 12.

If the first durable welding-type product has been uninstalled (block 412), then at block 414 the control circuit determines the consumption function of the wire type detected in block 404 by comparing the amount of wire fed calculated in block 408 to a baseline amount of wire fed. At block 416, the consumption function is stored in memory of the control circuit 22 to be used for example, as the consumption function in block 210 of the method 200 of FIG. 2. In some examples, method 400 may be run multiple times, and the determined consumption function of the wire type for the first durable welding-type product is a statistical average (or median, or other filtered result) calculated based on the various results obtained in block 408 of each run of method 400. Accordingly, in some examples, the consumption function stored in memory may be updated after each time a first durable welding-type product is uninstalled, based on the tracked amount of welding wire fed (block 408) with the detected wire type (block 404).

Figure 5:
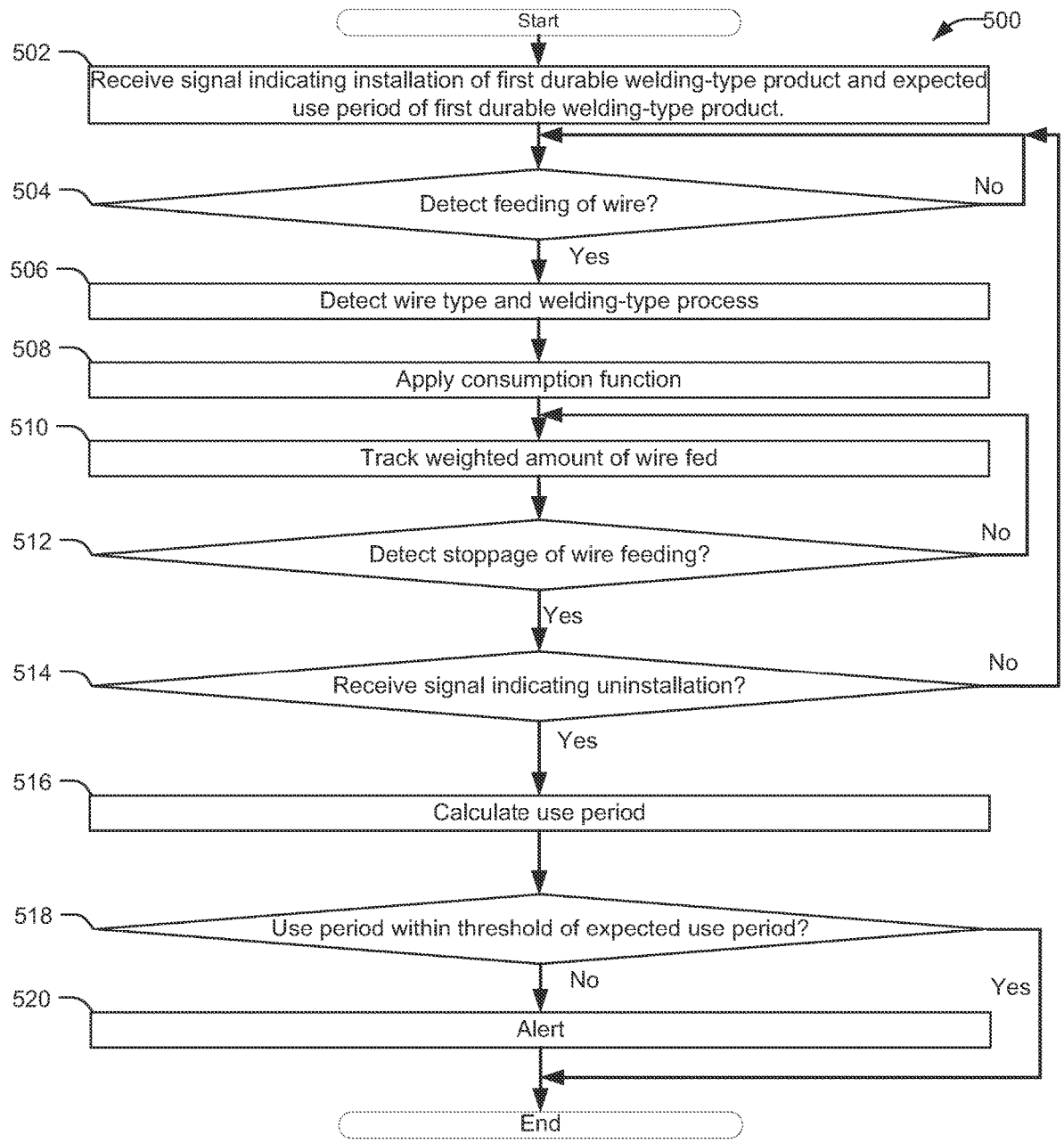
FIG. 5 is a flow chart representative of example machine readable instructions which may be executed by the welding-type system of FIG. 1a to determine if a durable welding-type product is changed more frequently than an expected use period of the durable welding-type product would suggest is necessary.

FIG. 5 is a flow chart representative of example machine readable instructions 500 which may be executed by the system 100 of FIG. 1a to determine if a durable welding-type product is changed more frequently than a recommended use period of the durable welding-type product would suggest is necessary. The machine readable instructions 300 may be partially or completely implemented by the control circuit 22 or 32 or processing circuit 55 of FIG. 1a.

At block 502, the control circuit 22 receives a signal indicating the installation of a first durable welding-type product and receives an indication of an expected or recommended use period of the durable welding-type product. The recommended use period may be determined, for example via the method 300 of FIG. 3. At block 504, the control circuit 22 monitors whether any welding wire has been fed by the wire feeder 12, for example via monitoring signals from a tachometer 50 connected to the wire feed motor 46. If the control circuit 22 detects that the wire feeder 12 is feeding welding wire (block 504), then at block 506, the control circuit 22 detects the wire type (i.e. gauge, geometry, and/or material) and the welding-type process (i.e. constant current, spray, pulsed, voltage, current, etc.).

At block 508, the control circuit 22 applies consumption function to the consumption of welding wire based on the welding wire type and the welding-type process, as described with reference to block 210 of method 200 of FIG. 2. At block 510, the control circuit 22 tracks the weighted amount of welding wire fed by multiplying the tracked amount of welding wire fed by the consumption function for the fed welding wire. At block 512, the control circuit 22 monitors for the stoppage of wire feeding. If the control circuit 22 detects that the wire feeder 12 is still feeding welding wire (block 512), then the control circuit 22 returns to block 510 to continue monitoring the feeding of welding wire.

If the control circuit 22 detects that the wire feeder 12 is no longer feeding welding wire (block 512), then the control circuit 22 checks at block 514 whether the control circuit 22 has received a signal indicating that the first durable welding-type product has been uninstalled. If the first durable welding-type product has not been uninstalled (block 514), then the control circuit 22 returns to block 504 to continue to monitor whether welding wire is fed by the wire feeder 12. If the first durable welding-type product has been uninstalled (block 514), then at block 516 the control circuit 22 determines the use period of the first durable welding-type product based on the tracked weighted amount of wire fed calculated in block 510.

At block 518, the control circuit 22 compares the use period to the recommended use period in block 502. If the use period is within a threshold of the expected/recommended use period (block 518), then the process 500 ends. If the use period is less than the expected/recommended use period by a threshold amount (block 518), then at block 520 the control circuit 22 signals an alert. The alert can signal to an operator that the durable welding-type product was defective, or that operator error caused the durable welding-type product to degrade more quickly than expected.

In some examples, alerts for each cell 120, 140, and 160 are monitored at the computing device 112 of FIG. 1B. If the computing device 112 detects repeated alerts at a weld cell (120, 140, 160), the computing device 112 may flag the operator or weld cell (120, 140, 160) for investigation. For instance, the operator may be using poor technique, installing and/or using the contact tip or other equipment incorrectly, and/or simply replacing contact tips before replacement is warranted.

The present methods and systems may be realized in hardware, software, and/or a combination of hardware and software. Example implementations include an application specific integrated circuit and/or a programmable control circuit. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. A system for tracking welding-type products, comprising:
   processing circuitry; and
   memory circuitry comprising machine readable instructions which, when executed by the processing circuitry, cause the processing circuitry to:
   monitor a first consumed quantity of a welding consumable while a first durable welding product is installed in a first welding system,
   determine a first use period for the first durable welding product based on the first consumed quantity of the welding consumable,
   in response to receiving a first signal indicating an uninstallation of the first durable welding product, record the first use period as an estimated life period of a durable welding product,
   in response to a second signal indicating installation of a second durable welding product in a second welding system, monitor a second consumed quantity of the welding consumable while the second durable welding product is installed,
   determine a second use period for the second durable welding product based on the second consumed quantity of the welding consumable,
   retrieve the estimated life period of the durable welding product,
   compare the second use period to the estimated life period, and in response to the second use period being less than the estimated life period, output a remaining use period via an operator interface, wherein the remaining use period comprises a difference between the estimated life period and the second use period.

2. The system of claim 1, wherein the memory circuitry comprising machine readable instructions which, when executed by the processing circuitry, cause the processing circuitry to:
   determine whether an inventory amount of durable welding products is sufficient based on one or more welding requirements and the estimated life period, and
   in response to determining the inventory amount is not sufficient, place an order for more durable welding products.

3. The system of claim 1, wherein the welding consumable comprises a welding wire electrode or a shielding gas.

4. The system of claim 1, wherein each of the first durable welding product and second durable welding product comprises a wire liner, a contact tip, a welding gun nozzle, a gas diffuser, a tungsten electrode, a wire feed drive roll, a welding torch, or a fume extraction filter.

5. The system of claim 1, wherein the first welding system comprises a same weld cell as the second welding system.

6. The system of claim 1, wherein the first welding system comprises a different weld cell than the second welding system.

7. A system for tracking welding-type products, comprising:
   processing circuitry; and
   memory circuitry comprising machine readable instructions which, when executed by the processing circuitry, cause the processing circuitry to:
   identify a number of times one or more first durable welding products are installed or uninstalled,
   determine a use period for a second durable welding product based on the number of times the one or more first durable welding products are installed or uninstalled,
   determine whether the second durable welding product should be replaced based on the use period, and
   in response to determining the second durable welding product should be replaced, signal an alert via an operator interface or prevent the welding-type system from performing a welding-type operation.

8. The system of claim 7, wherein the memory circuitry comprises machine readable instructions which, when executed by the processing circuitry, cause the processing circuitry to:
   determine, each time a first durable welding product of the one or more first durable welding products is installed, whether the first durable welding product was previously installed or is being newly installed, and
   determine the use period for the second durable welding product based on the number of times the one or more first durable welding products are newly installed.

9. The system of claim 7, wherein determining whether the second durable welding product should be replaced comprises:
   determining whether the use period is greater than a threshold, and
   in response to determining the use period is greater than the threshold, determining that the second durable welding product should be replaced.

10. The system of claim 9, wherein determining whether the second durable welding product should be replaced further comprises retrieving an estimated life period associated with the second durable welding product, the estimated life period comprising the threshold.

11. The system of claim 7, wherein the memory circuitry comprises machine readable instructions which, when executed by the processing circuitry, cause the processing circuitry to:
   in response to receiving a first signal indicating an uninstallation of the second durable welding product, compare the use period of the second durable welding product to a final use period of a similar durable welding product, and
   in response to a difference between the use period of the second durable welding product and the final use period of the similar durable welding product being above a threshold, flag the welding-type system, or an operator associated with the welding-type system, for further investigation.

12. The system of claim 7, wherein each of the first durable welding product and the second durable welding product comprises a wire liner, a contact tip, a welding gun nozzle, a gas diffuser, a tungsten electrode, a wire feed drive roll, a welding torch, or a fume extraction filter.

13. The system of claim 7, wherein the memory circuitry comprises machine readable instructions which, when executed by the processing circuitry, cause the processing circuitry to: reset the use period in response to a signal indicating installation of a replacement second durable welding product.

14. A system for tracking welding-type products, comprising:
   processing circuitry; and memory circuitry comprising machine readable instructions which, when executed by the processing circuitry, cause the processing circuitry to:
  monitor a first consumed quantity of a welding consumable while a first durable welding product is installed in a first welding system,
  determine a first use period for the first durable welding product based on the first consumed quantity of the welding consumable,
  in response to receiving a first signal indicating an uninstallation of the first durable welding product, record the first use period as an estimated life period of a durable welding product,
  in response to a second signal indicating installation of a second durable welding product in a second welding system, monitor a second consumed quantity of the welding consumable while the second durable welding product is installed,
  determine a second use period for the second durable welding product based on the second consumed quantity of the welding consumable,
  retrieve the estimated life period of the durable welding product,
  compare the second use period to the estimated life period, and
  in response to the second use period being greater than the estimated life period, signal an alert via an operator interface or prevent the welding-type system from performing a welding-type operation.

15. The system of claim 14, wherein the memory circuitry comprising machine readable instructions which, when executed by the processing circuitry, cause the processing circuitry to:
  determine whether an inventory amount of durable welding products is sufficient based on one or more welding requirements and the estimated life period, and
  in response to determining the inventory amount is not sufficient, place an order for more durable welding products.

16. The system of claim 14, wherein the welding consumable comprises a welding wire electrode or a shielding gas.

17. The system of claim 14, wherein each of the first durable welding product and second durable welding product comprises a wire liner, a contact tip, a welding gun nozzle, a gas diffuser, a tungsten electrode, a wire feed drive roll, a welding torch, or a fume extraction filter.

18. The system of claim 14, wherein the first welding system comprises a same weld cell as the second welding system.

19. The system of claim 14, wherein the first welding system comprises a different weld cell than the second welding system.

* * * * *